US012425505B2

(12) United States Patent
Fraczek (10) Patent No.: US 12,425,505 B2
(45) Date of Patent: Sep. 23, 2025

(54) SMARTPHONE SUPPORT ACCESSORY DEVICE FOR AT LEAST ONE FINGER OF A USER

(71) Applicant: Jason Paul Fraczek, Woodstock (CA)

(72) Inventor: Jason Paul Fraczek, Woodstock (CA)

( * ) Notice: Subject to any disclaimer, the term of this patent is extended or adjusted under 35 U.S.C. 154(b) by 397 days.

(21) Appl. No.: 18/177,705

(22) Filed: Mar. 2, 2023

(65) Prior Publication Data

US 2024/0297931 A1    Sep. 5, 2024

(51) Int. Cl.
*H04M 1/00* (2006.01)
*A45F 5/00* (2006.01)
*H04M 1/04* (2006.01)

(52) U.S. Cl.
CPC ............ *H04M 1/04* (2013.01); *A45F 5/00* (2013.01); *A45F 5/1516* (2025.01)

(58) Field of Classification Search
CPC ............ H04M 1/04; A45F 5/00; A45F 5/1516
See application file for complete search history.

(56) References Cited

U.S. PATENT DOCUMENTS

| 8,801,065 | B1 * | 8/2014 | Jones | G06F 1/1613 |
| | | | | 294/25 |
| 9,074,725 | B2 * | 7/2015 | Trotsky | A45F 5/00 |
| 10,342,323 | B2 * | 7/2019 | Forutanpour | A45F 5/10 |
| 2012/0118770 | A1 * | 5/2012 | Valls | F16M 13/04 |
| | | | | 248/688 |
| 2016/0157592 | A1 * | 6/2016 | Shmulevich | H04M 1/04 |
| | | | | 294/137 |
| 2017/0134064 | A1 * | 5/2017 | Rodriguez | H04B 1/3888 |
| 2017/0366653 | A1 * | 12/2017 | Roncetti | H04M 1/0281 |
| 2020/0259517 | A1 * | 8/2020 | Hirsch | A45F 5/00 |

\* cited by examiner

*Primary Examiner* — Pakee Fang
(74) *Attorney, Agent, or Firm* — Orin Del Vecchio

(57) ABSTRACT

A portable phone accessory that is configured to be secured to the rear side of the housing of a smartphone wherein the present invention is movable so as to provide support for at least one finger of a hand of a user grasping the portable phone. The present invention includes a base member secured to the housing of the smartphone. A support member is rotatably secured to the base member and is configured to be rotatable to a multitude of positions. The support member includes a first portion and a second portion wherein the second portion extends outward from the first portion. A finger support member is integrally formed with the second portion distal to said first portion of the support member. The finger support member is arcuate in shape having a radius configured to cradle a finger of a user while clutching the portable phone.

9 Claims, 6 Drawing Sheets

SMARTPHONE SUPPORT ACCESSORY DEVICE FOR AT LEAST ONE FINGER OF A USER

FIELD OF THE INVENTION

The present invention relates generally to cellular phones, more specifically but not by way of limitation, a device configured to secure to the back of a cellular phone wherein the device is rotatable so as to provide a structure in which a user may rest one or more of their fingers during utilization of the cellular phone.

BACKGROUND

As of 2019, research indicates that about 81 percent of individuals residing in the United States own smartphones. The typical utilization rate for smartphones is approximately two hours per day. As is known in the art, most users will often hold the smartphone in their hand during utilization thereof. The fingers most impacted by holding a smartphone, are the pinky finger and thumb. Users will often spend most of their time during utilization of the smartphone by either gripping or clutching the phone with their hand. During this activity the fingers and thumb can begin to cramp or become inflamed. This damage to the pinky finger of the user is commonly referred to as smartphone finger or smartphone pinky syndrome.

Each hand is made of 27 bones, 35 muscles, and over 100 tendons connecting bones and muscles. The flexor tendons are the tendons that bend the fingers and tendons that straighten the fingers are called extensor tendons. When the muscles in the fingers need to make a movement, such as manipulate position of the pinky finger during utilization of a smartphone the tendons will contract and extend. Repetitive movements can tire these tendons out, resulting in wear and tear on the tendon as well as soreness and inflammation. Smartphone pinky finger can be the result of constant pressure on the pinky joint as you hold your device. Symptoms of smartphone finger may include but are not limited to: pain or stiffness at the base of the affected finger, a clicking sound when you move your pinky finger, difficulty moving your fingers when you wake up in the morning and numbness in your fingertip.

Accordingly, there is a need for a device that can be operably coupled to a smartphone wherein the device is configured to provide support for the pinky finger of the hand of the user so as to reduce the stress placed thereon.

SUMMARY OF THE INVENTION

It is the object of the present invention to provide an accessory for a smartphone that is configured to be secured to the rear side thereof wherein the accessory is operable to provide a support surface for a pinky finger of a user of a smartphone.

Another object of the present invention is to provide a finger support device for a cellular phone wherein the present invention includes a base member that is configured to be secured to the rear side of the cellular phone.

A further object of the present invention is to provide an accessory for a smartphone that is configured to be secured to the rear side thereof wherein the base member has movably coupled thereto a support member.

Yet a further object of the present invention is to provide a finger support device for a cellular phone wherein the support member of the present invention includes a first portion and a second portion wherein the second portion of the support member extends outward from the first portion.

Still another object of the present invention is to provide an accessory for a smartphone that is configured to be secured to the rear side thereof wherein the second portion of the support member has integrally formed therewith a finger support member.

An additional object of the present invention is to provide a finger support device for a cellular phone wherein the first portion of the support member can have a housing surroundably mounted thereabout.

Yet a further object of the present invention is to provide an accessory for a smartphone that is configured to be secured to the rear side thereof wherein the first portion is rotatable so as to be placed in a multitude of positions so as to orient the second portion and as such the finger support member in a multitude of positions.

Still an additional object of the present invention is to provide a finger support device for a cellular phone wherein the support member, in particular the first portion, can employ alternate types of techniques to control the rotation and orientation thereof with respect to the base member.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Referring now to the drawings submitted herewith, wherein various elements depicted therein are not necessarily drawn to scale and wherein through the views and figures like elements are referenced with identical reference numerals, there is illustrated a portable phone accessory 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the portable phone accessory 100 includes a base member 10. The base member 10 is annular in shape having a lower surface 11 and an upper surface 12. The lower surface 11 is configured to be secured to the rear side 98 of the phone housing 99 utilizing s suitable durable technique such as but not limited to a pressure sensitive adhesive. It should be understood within the scope of the present invention that the base member 10 could be secured to the housing 99 utilizing numerous alternate techniques to include but not be limited to mechanical fasteners or chemical adhesion. While the base member 10 is illustrated as being annular in shape, it should be understood within the scope of the present invention that the base member 10 could be provided in alternate shapes and sizes.

The base member 10 includes post 15 integrally formed therewith and extending upward from the upper surface 12 of the base member 10 being perpendicular thereto. Post 15 is configured to be journaled into cavity 18 of the support member 20 and facilitate rotational movement of the support member 20 in relation to the base member 10. As is further discussed herein, it is contemplated within the scope of the present invention that the base member 10 and support member 20 could be configured in numerous alternate manners so as to facilitate rotational movement and subsequent orientation of the support member 20. For the embodiment illustrated herein FIG. 1, the post member 15 permits rotational movement of the support member 20. Magnets 25 secured within the base member 10 and support member 20 facilitate the ability for the support member 20 to be secured in alternate positions. It should be understood within the scope of the present invention that numerous quantities of magnets could be employed so as to provide a multitude of orientational positioning of the support member 20 with respect to the base member 10.

Figure 1:
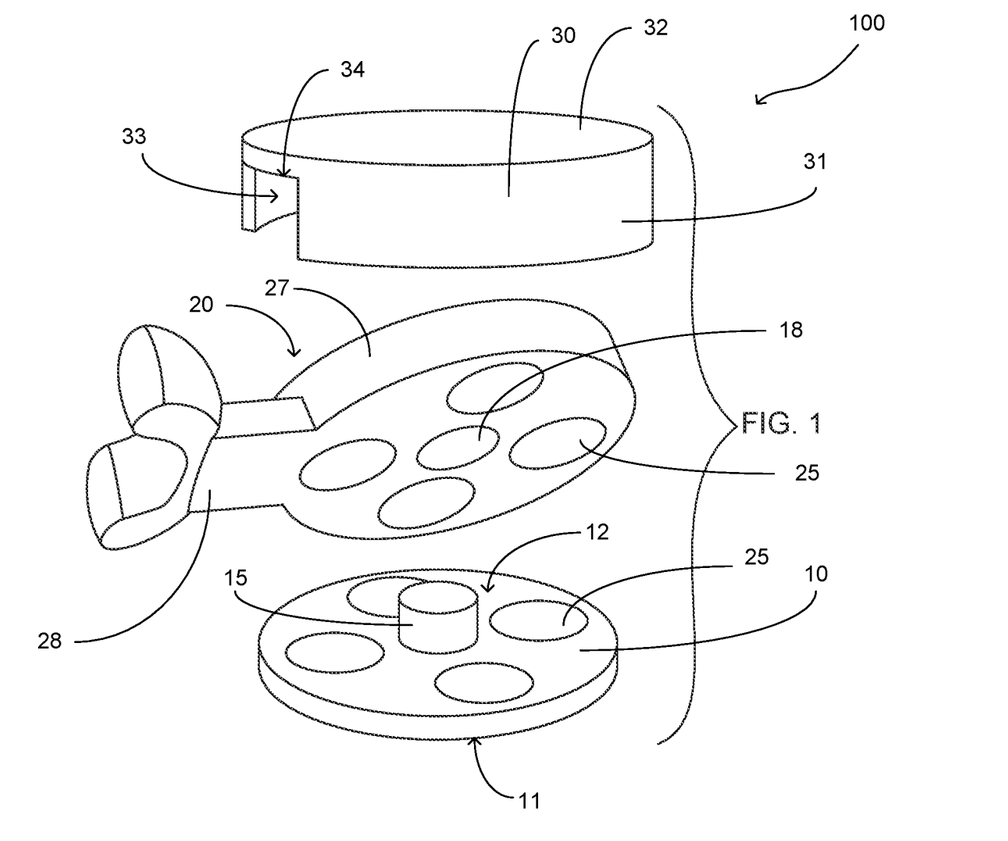
FIG. 1 is an exploded view of the present invention.
Figure 2:
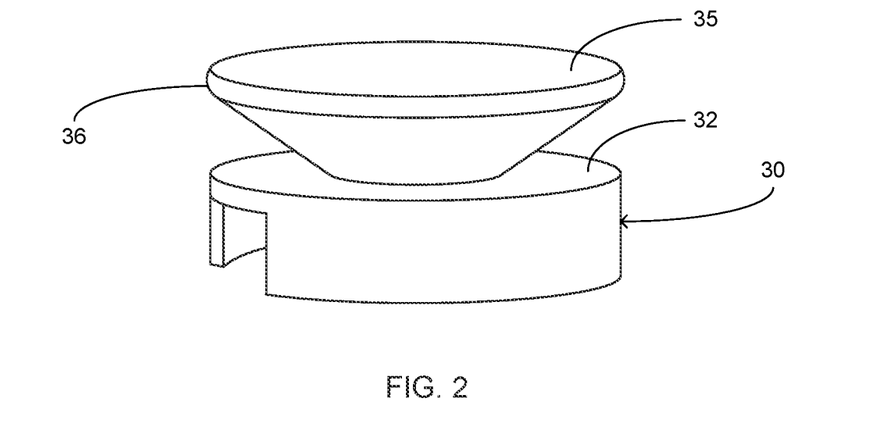
FIG. 2 is a view of the housing with the extension member in its second position.

Still referring to FIG. 1, the portable phone accessory 100 includes a housing 30 that is configured to be releasably secured over the first portion 27 of the support member 20. The housing 30 includes wall 31 and top 32 being integrally formed to create an interior volume 33 of suitable size so as to mateably receive therein the first portion 27 of the support member 20. Wall 31 includes slot 34 wherein slot 34 is sized so as to accommodate the second portion 28 of the support member 20. The housing 30 is mateably shaped to be superposed the first portion 27 of the support member 20 and is provided in any shape mateable to that of the shape in which the first portion 27 of the support member 20 is formed. Referring in particular to FIG. 2 submitted herewith, the housing 30 is illustrated with an extension member 35. The extension member 35 is operably coupled to the housing 30 utilizing suitable durable techniques. The extension member 35 is movable between a first position and a second position, wherein the extension member 35 is illustrated in its second position in FIG. 2. The extension member 35 is movable between its first position and its second position utilizing various alternate techniques such as but not limited to a spring. In its second position, the upper portion 36 of the extension member 35 is distal to the top 32 of the housing 30 so as to enable a propped orientation of the phone housing 99 on a suitable support surface. In its first position, the upper portion 36 is adjacent the top 32. It should be understood within the scope of the present invention that the extension member 35 could be provided in various shapes and be configured to extend outward into its second position at alternate distances.

Figure 3:
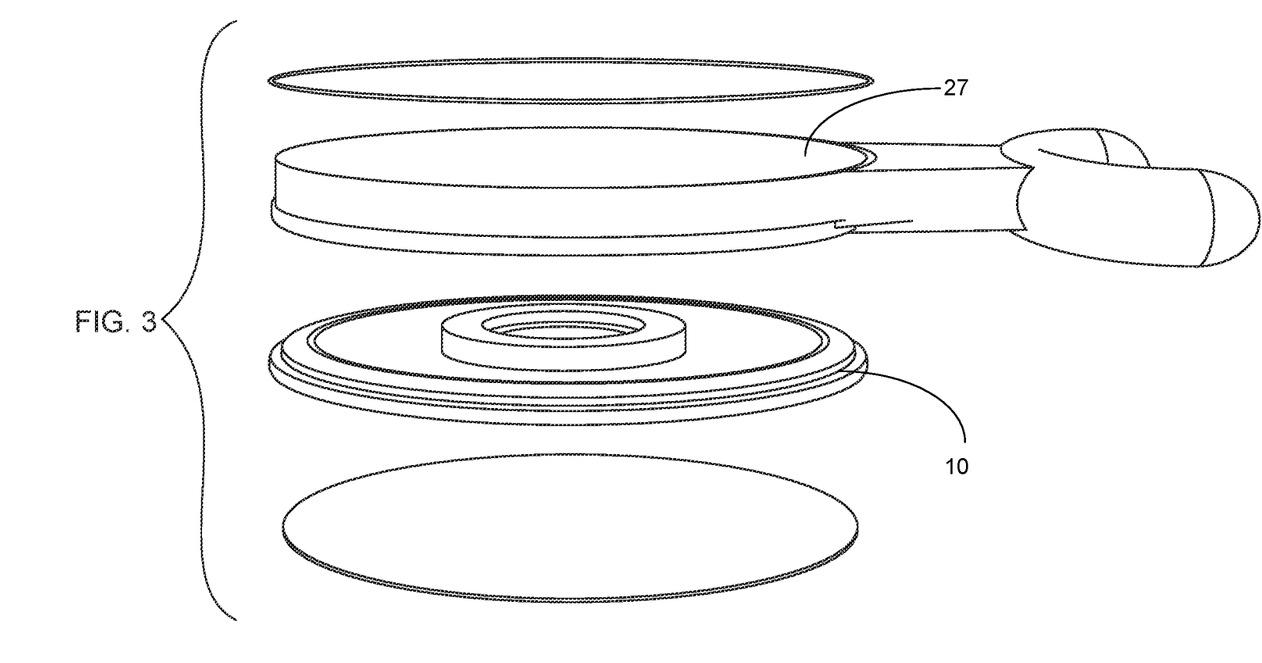
FIG. 3 is an exploded view of an exemplary embodiment of the present invention.
Figure 4:
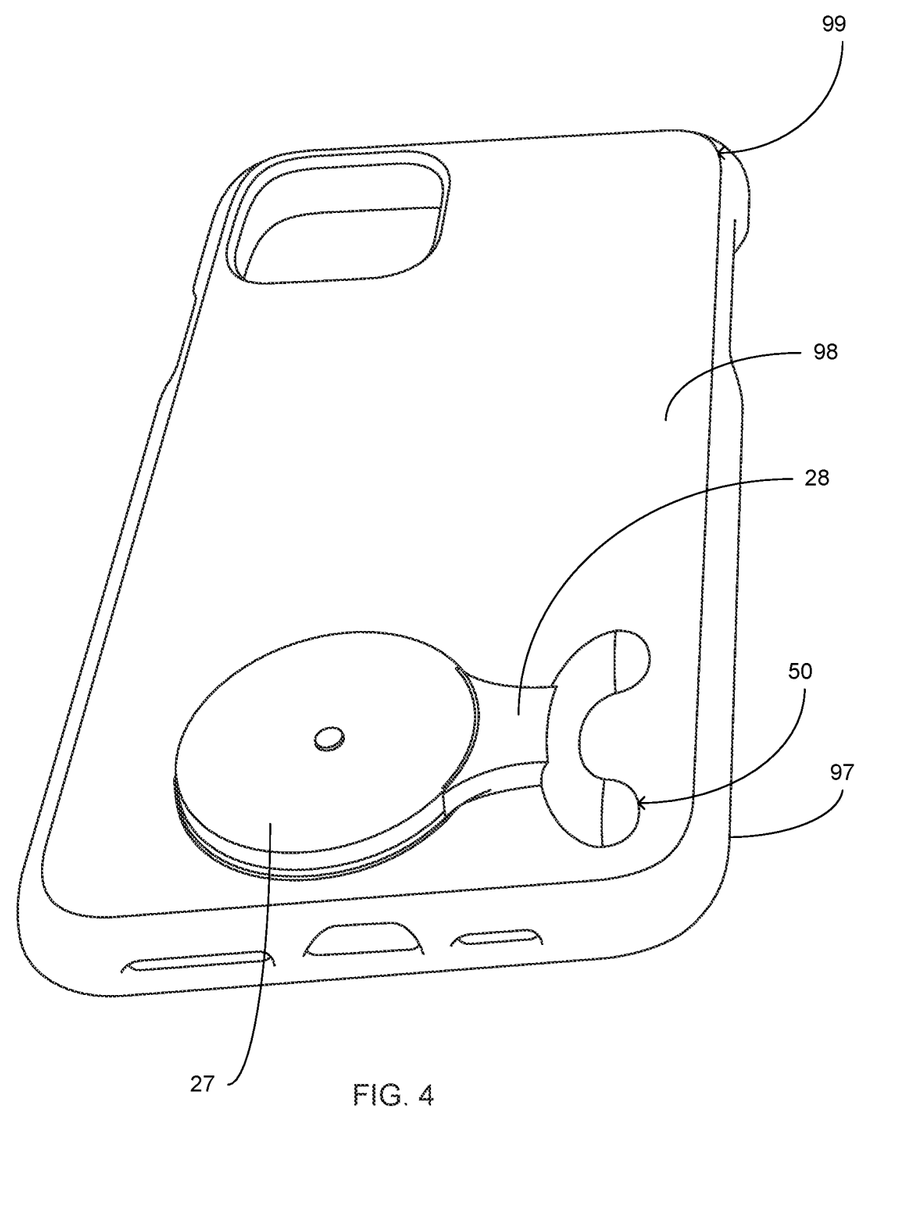
FIG. 4 is a view of the present invention secured to an exemplary smartphone.
Figure 5:
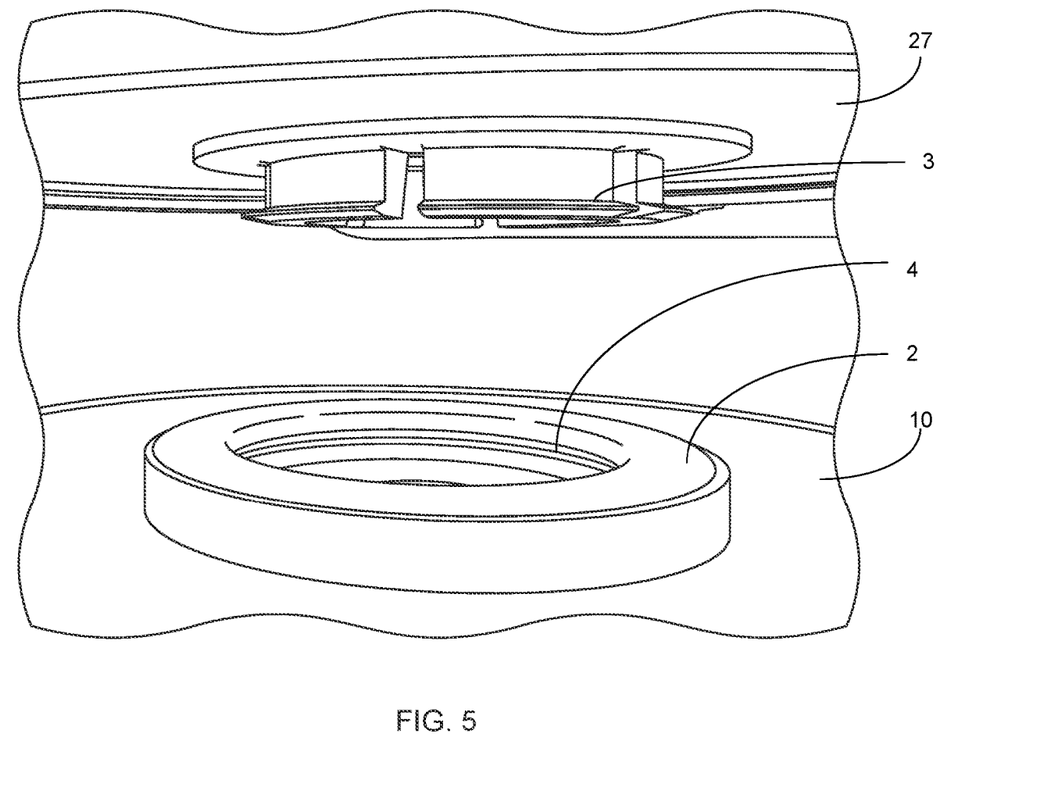
FIG. 5 is a detailed view of an exemplary mechanism configured to control the rotation and position of the first portion of the support member.

Referring to FIG. 3 and FIG. 5 submitted herewith, alternate techniques for providing rotational movement and positional control of the first portion 27 of the support member 20 are illustrated herein. As stated herein, it is contemplated within the scope of the present invention that the rotational control and positional fixation of the first portion 27 could be accomplished utilizing numerous alternate techniques and/or elements. In FIG. 5 submitted herewith, the base member 10 includes a receiving member 2 configured to operably coupled with engagement members 3 in order to facilitate rotational movement of the first portion 27 and an ability to maintain the orientation thereof. The engagement members 3 are formed to operably couple with formation 4 and provide frictional engagement between the first portion 27 and the base member 10. In FIG. 3, another alternative embodiment illustrates the base member 10 configured to operably couple to the first portion 27. It should be understood within the scope of the present invention that the first portion 27 of the support member 20 could be manufactured such that a lower section thereof and an upper section thereof are rotatably coupled so as to achieve the functionality described herein without a need for the base member 10.

Figure 6:
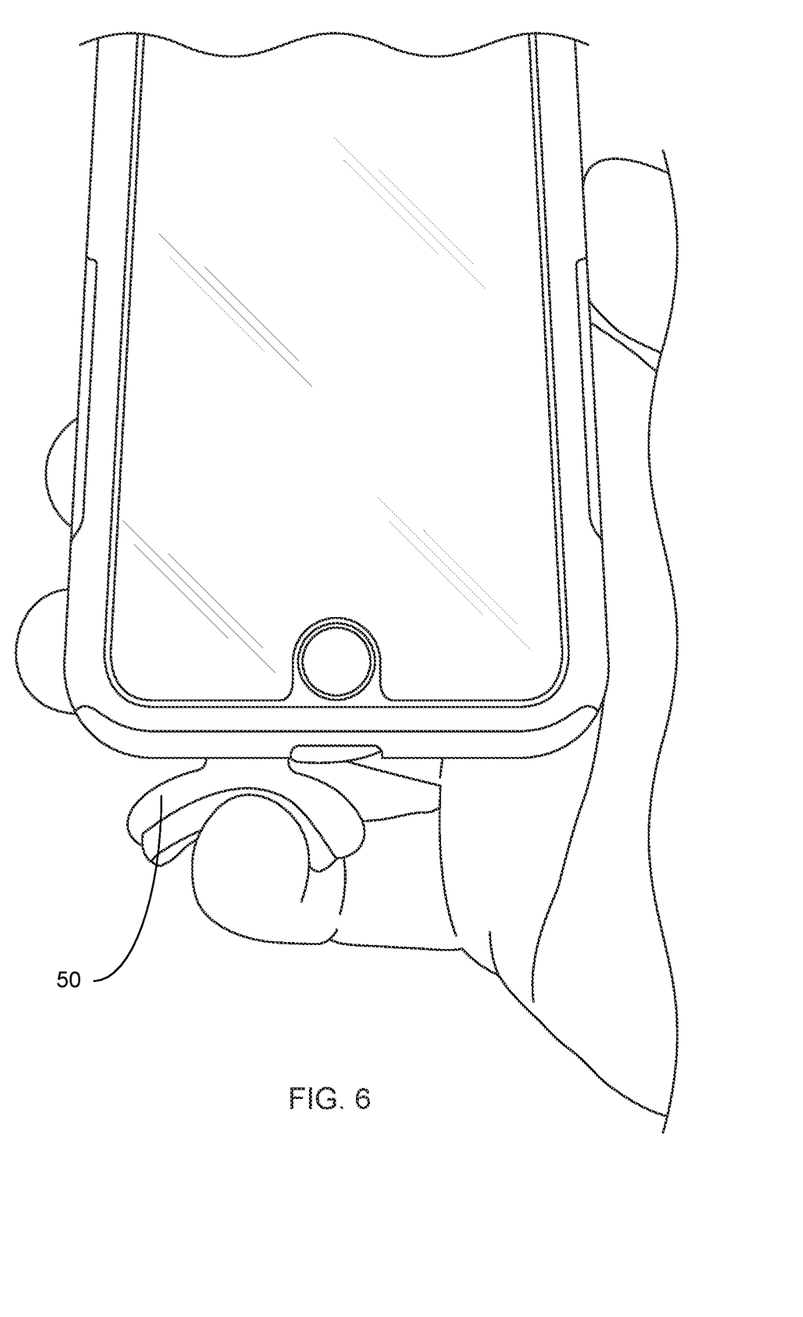
FIG. 6 is a front view of an exemplary smartphone with the finger support member extended outward beyond the housing of the smartphone.
Figure 7:
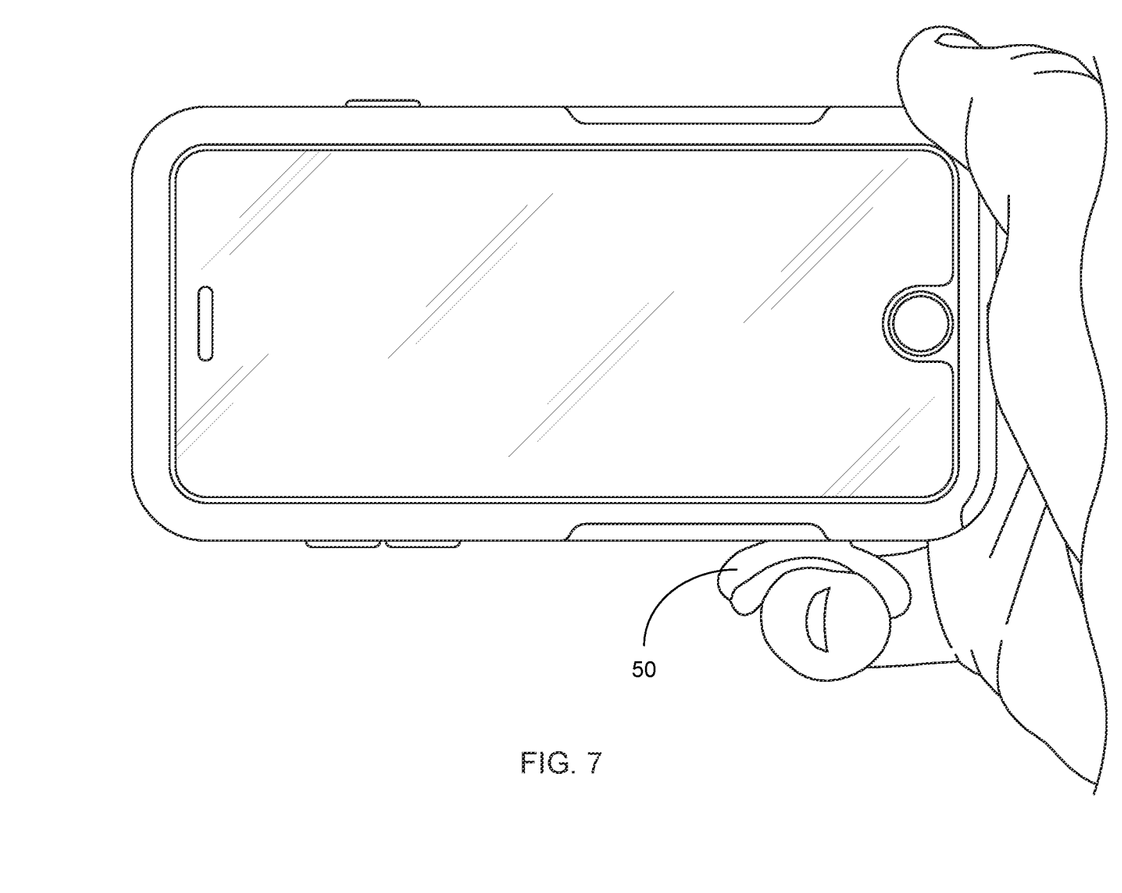
FIG. 7 is an additional front view of an exemplary smartphone with the finger support member extended outward beyond the housing of the smartphone.

The second portion 28 of the support member 20 includes finger support member 50. The finger support member 50 is integrally formed with the second portion 28 distal to the first portion 27. The finger support member 50 is arcuate in form so as to cradle a finger, as is illustrated herein in FIG. 6 and FIG. 7. It is contemplated within the scope of the present invention that the radius of the finger support member 50 could vary in order to accommodate either a single finger or more than one finger. While the finger support member 50 is illustrated as being arcuate in shape herein, it is contemplated within the scope of the present invention that the finger support member 50 could be provided in alternate shapes in order to achieve the desired objective stated herein. Additionally, alternate radiuses of the finger support member 50 could be employed to accommodate a finger larger in diameter or a finger smaller in diameter. In its first position the support member 20 is rotated such that the finger support member 50 is within the perimeter edge 97 of the phone housing 99. In a second position, the support member 20 is rotated such that at least a portion of the finger support member 50 extends beyond the perimeter edge 97 of the phone housing 99. In its second position, a user of the portable phone accessory 100 can employ the finger support member 50 to engage a finger 96 in order to provide additional support and comfort for the user. Exemplary positions of the finger support member 50 are illustrated herein in FIG. 6 and FIG. 7 but it should be understood within the scope of the present invention that the support member 50 is rotatable and positionable so as to provide a multitude of positions for the finger support member 50 in order to facilitate engagement therewith by a user of the portable phone accessory 100. It should be understood within the scope of the present invention that the finger support member 50 could have a cushion such as but not limited to gel or foam in order to increase the comfort thereof. It should be further understood within the scope of the present invention that while the exemplary utilization of the portable phone accessory 100 employs a smartphone, the portable phone accessory 100 could be secured and utilized on numerous alternate types of devices (both electronic and non-electronic) to include but not be limited to tablet PC and media players. It should be further understood within the scope of the present invention that the finger support member 50 could be employed by a user to provide support for the thumb instead of or in addition to the pinky finger of their hand.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A portable media device accessory operable to provide support for at least one finger of a user wherein the portable media device accessory comprises:
   a support member, said support member being secured to a rear side of the portable media device, said support member having a first portion and a second portion, said first portion being configured to be rotatable, said second portion extending outward from said first portion;
   a finger support member, said finger support member being integrally formed with said second portion distal to said first portion, said finger support member shaped to provide support for the at least one finger during a user grasping the portable media device;
   a housing, said housing configured to be superposed said first portion of said support member, said housing includes at least one wall and a top, said housing further having an extension member, said extension member operably coupled to said top of said housing, said extension member configured to be moved between a first position and a second position, wherein in said second position said extension member is extended outward from said top of said housing; and
   wherein the finger support member is extended beyond a perimeter edge of a housing of the portable media device in order to facilitate engagement with the at least one finger.

2. The portable media device accessory operable to provide support for the at least one finger of the user as recited in claim 1, wherein said finger support member is arcuate in shape.

3. The portable media device accessory operable to provide support for the at least one finger of the user as recited in claim 2, wherein said first portion is rotatable utilizing a technique selected from one of the following techniques: mechanical or magnetic.

4. A smartphone accessory operable to provide support for a finger or thumb of a user wherein the smartphone accessory comprises:
   a base member, said base member having a lower surface and an upper surface, said base member configured to have said lower surface secured to a rear side of a housing of the smartphone,
   a support member, said support member configured to be rotatably coupled to said base member, said support member having a first portion and a second portion, said first portion being configured to movably coupled to said upper surface of said base member, said second portion extending outward from said first portion;
   a finger support member, said finger support member being integrally formed with said second portion of said support member distal to said first portion of said support member, said finger support member shaped to provide support for a finger or thumb during a user grasping the smartphone;
   a housing, said housing configured to be superposed said first portion of said support member, said housing being mateable in shape with said first portion, said housing having at least one wall and a top forming an interior volume suitable to accommodate the first portion therein; and
   wherein the first portion of the support member is rotatable between a first position and a second position, wherein in said second position said finger support member is at least partially extended beyond a perimeter edge of the housing of the smartphone.

5. The smartphone accessory operable to provide support for a finger or thumb of a user as recited in claim 4, wherein said finger support is arcuate in shape.

6. The smartphone accessory operable to provide support for a finger or thumb of a user as recited in claim 5, wherein said at least one wall of said housing further includes a slot, said slot configured to accommodate said second portion of said support member.

7. The smartphone accessory operable to provide support for a finger or thumb of a user as recited in claim 6, and further including an extension member, said extension member operably coupled to said top of said housing, said extension member configured to be moved between a first position and a second position, wherein in said second position said extension member is extended outward from said top of said housing.

8. The smartphone accessory operable to provide support for a finger or thumb of a user as recited in claim 7, wherein said first portion is annular in shape.

9. The smartphone accessory operable to provide support for a finger or thumb of a user as recited in claim 8, wherein said first portion is rotatable utilizing a technique selected from one of the following techniques: mechanical or magnetic.

\* \* \* \* \*